(12) United States Patent
Lim

(10) Patent No.: US 9,914,451 B2
(45) Date of Patent: Mar. 13, 2018

(54) ELECTRONIC 4WD SYSTEM HAVING REINFORCED ABS COOPERATIVE CONTROL PERFORMANCE AND METHOD OF CONTROLLING SAME

(71) Applicant: HYUNDAI MOTOR COMPANY, Seoul (KR)

(72) Inventor: Sung-Keun Lim, Suwon-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 385 days.

(21) Appl. No.: 14/720,733

(22) Filed: May 22, 2015

(65) Prior Publication Data

US 2016/0101777 A1 Apr. 14, 2016

(30) Foreign Application Priority Data

Oct. 10, 2014 (KR) ........................ 10-2014-0136806

(51) Int. Cl.
*B60W 30/02* (2012.01)
*B60W 10/119* (2012.01)
*B60W 10/184* (2012.01)
*B60W 30/18* (2012.01)
*B60K 23/08* (2006.01)
(Continued)

(52) U.S. Cl.
CPC ............ *B60W 30/02* (2013.01); *B60K 23/08* (2013.01); *B60T 8/1755* (2013.01); *B60T 8/1769* (2013.01); *B60W 10/119* (2013.01); *B60W 10/184* (2013.01); *B60W 30/18109* (2013.01); *B60W 50/10* (2013.01); *B60T 2270/12* (2013.01); *B60W 2540/10* (2013.01); *B60W 2540/12* (2013.01); *B60W 2710/182* (2013.01); *B60W 2720/403* (2013.01)

(58) Field of Classification Search
CPC .. B60W 10/119; B60W 10/184; B60W 30/02; B60W 30/18109; B60T 8/1755; B60T 8/1769; B60K 17/34
See application file for complete search history.

(56) References Cited

U.S. PATENT DOCUMENTS 9,180,848 B2 * 11/2015 Akamine ............... B60T 8/1755
9,358,883 B2 * 6/2016 Hanna .................... B60W 50/14
9,416,876 B2 * 8/2016 Capito .................. F16H 63/486

FOREIGN PATENT DOCUMENTS

JP 2003-127690 A 5/2003
JP 2011-131618 A 7/2011
(Continued)

*Primary Examiner* — Jacob S. Scott
*Assistant Examiner* — Tinh Dang
(74) *Attorney, Agent, or Firm* — McDermott Will & Emery LLP

(57) ABSTRACT

The present invention relates to an electronic 4WD system having reinforced ABS cooperative control performance, in which an ABS ACT signal by an ABS (Anti-Lock Brake System) controller and a 4WD_OPEN signal by the ESC (Electronic Stability Control) controller are used. When the ABS ACT signal and the 4WD_OPEN signal are recognized, it is determined that it is an ESC vehicle and a 4WD mode is stopped. When only the ABS ACT signal is recognized, it is determined that it is an ABS vehicle and the intention of a user is determined on the basis of whether a brake pedal has been pressed down or an accelerator pedal has been released, and then a 4WD mode is stopped.

4 Claims, 4 Drawing Sheets

(51) Int. Cl.
  *B60W 50/10* (2012.01)
  *B60T 8/1769* (2006.01)
  *B60T 8/1755* (2006.01)

(56) References Cited

FOREIGN PATENT DOCUMENTS

| | | |
|---|---|---|
| KR | 10-1998-0034967 A | 8/1998 |
| KR | 10-2003-0091321 A | 12/2003 |
| KR | 10-2007-0060851 A | 6/2007 |

\* cited by examiner

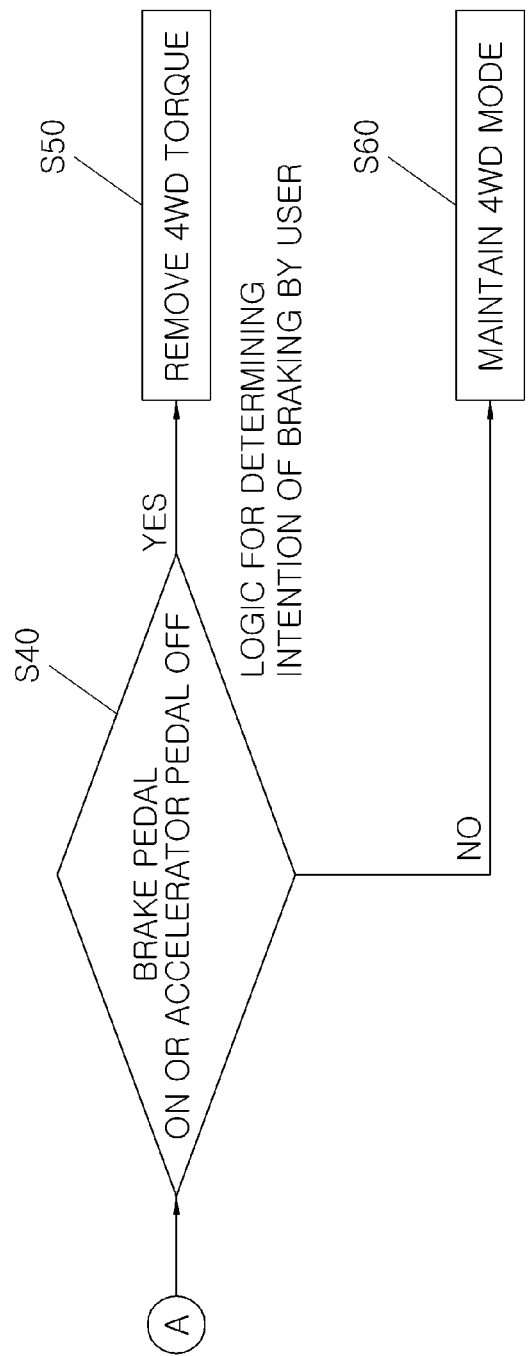

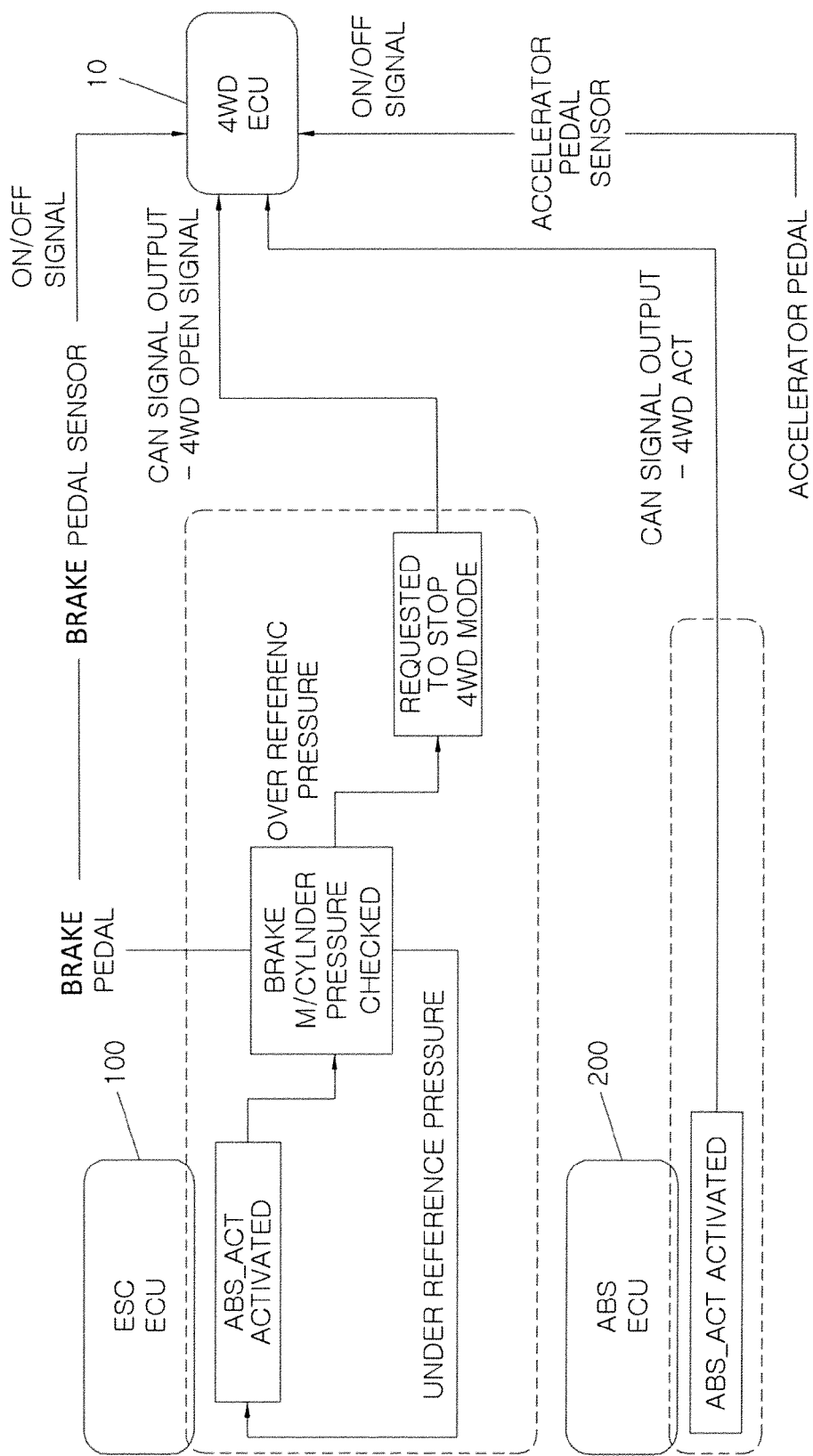

ELECTRONIC 4WD SYSTEM HAVING REINFORCED ABS COOPERATIVE CONTROL PERFORMANCE AND METHOD OF CONTROLLING SAME

CROSS-REFERENCE TO RELATED APPLICATION

This application claims priority to Korean Patent Application No. 10-2014-0136806, filed on Oct. 10, 2014 with the Korean Intellectual Property Office, which is incorporated herein by reference in its entirety.

BACKGROUND OF THE INVENTION

Field of the Invention

Exemplary embodiments of the present invention relate to an electronic 4WD system, and more particularly, to an electronic 4WD system preventing undesirable conversion into a 2WD mode due to a side effect of a 4WD control logic without an additional logic of an ABS (Anti-Lock Brake System) ECU (Electronic Control unit), and a method of controlling the same.

Description of Related Art

In general, an ESC (Electronic Stability Control) system, a TCS (Brake Traction Control System), and an ABS (Anti-Lock Brake System) are a kind of devices for reinforcing stability of a vehicle.

The ESC system is based on a technology of keeping a vehicle in a stable position and correcting a mistake by a driver by sensing all of the position of a steering wheel, the speed of wheels, and the centrifugal force on the vehicle, the TCS is based on a technology of preventing slip of driving wheels when a vehicle is suddenly started or accelerated, and the ABS is based on a technology of preventing skid of wheels when a vehicle is braked.

Accordingly, the ESC system, TSC, and ABS improve the performance of 4WD (Four Wheel Drive) vehicles that obtain the maximum driving force by simultaneously rotating four, that is, front and rear wheels. In particular, a 4WD control logic of an electronic 4WD system in a 4WD vehicle further improves stability of a vehicle against sudden start, sudden acceleration, sudden turn, driving on a rough road, and driving on a low friction road, by cooperatively operating with a ECS system, a TCS, and an ABS.

For example, in an emergency such as when an ABS is operated, the electronic 4WD system is stopped by cooperative control of an ABS ECU and a 4WD ECU performed by 4WD control logic, thereby implementing cooperative control that considers first the braking stability of a vehicle.

SUMMARY OF THE INVENTION

However, the 4WD control logic in a 4WD ECU generates a side effect such as an undesired stop of 4WD control due to an operation signal of an ABS, so it may deteriorate the 4WD performance in cooperative control with an ABS.

For example, while a 4WD vehicle with only an ABS (hereafter, referred to as an ABS solo 4WD vehicle) is driven on a low-friction road (snowy road or icy road), when an ABS signal is generated by the difference in speed of a left wheel and a right wheel even if a brake pedal is not operated, a 4WD control logic performs cooperative control for preventing 4WD control for reinforcing driving stability of the vehicle, so a 4WD mode is converted into a 2WD mode. Accordingly, the 4WD performance on a low-friction road (snowy road or icy road) is deteriorated and an electronic 4WD system may be shut down.

The side effects of the 4WD control logic can be removed by an ESC ECU with a logic capable of removing the side effect, but an ABS ECU, unlike the ESC ECU, cannot be provided with a logic capable of removing the side effect of the 4WD control logic.

An embodiment of the present invention is directed to provide an electronic 4WD system having reinforced ABS cooperative control performance and a method of controlling the same of preventing the performance of ABS SOLO 4WD and shutting-down of an electronic 4WD system, by removing a side effect of a 4WD control logic performing cooperative control with an ABS from intention of braking by a driver through a brake pedal or an accelerator pedal, particularly, removing the limit in mounting a logic on the ABS with a sub-logic of the electronic 4WD system, when a vehicle is driven on a low-friction road (snowy road or icy road) in which the ABS ACT is activated even without operating the brake pedal.

In accordance with an embodiment of the present invention, a method of controlling an electronic 4WD system having reinforced ABS cooperative control performance includes: (A) recognizing, by an electronic 4WD system, an ABS ACT signal by an ABS (Anti-Lock Brake System) and a 4WD_OPEN signal by an ESC (Electronic Stability Control) controller; (B) determining that a driver intends to brake a vehicle and stopping a 4WD mode, when the ABS ACT signal and the 4WD_OPEN signal are both recognized; (C) determining whether the vehicle is braked by intention of the driver on the basis of a brake pedal signal, when only the ABS ACT signal is recognized; and (D) stopping the 4WD mode upon determination that the vehicle is braked by intention of the driver when the brake pedal signal is transmitted, or maintaining the 4WD mode upon determination that the vehicle is braked regardless of intention of the driver, when the brake pedal signal is not transmitted.

The determining whether the vehicle is braked by intention of the driver may further use a signal showing release of an accelerator pedal.

In accordance with another embodiment of the present invention, an electronic 4WD system having reinforced ABS cooperative control performance includes an ABS (Anti-Lock Brake System) controller and an ESC (Electronic Stability Control) controller that are connected by CAN communication, in which the system includes an ABS sub-logic that determines that it is an ESC vehicle and stops a 4WD mode when an ABS ACT signal by the ABS controller and a 4WD_OPEN signal by the ESC controller are both recognized, and determines that it is an ABS SOLO vehicle when only the ABS ACT signal is recognized, and stops the 4WD mode only when a signal indicating that a brake pedal has been pressed down or a signal indicating that an accelerator pedal has been released is detected.

According to the present invention, since the side effect of a 4WD control logic such as undesired stop of 4WD control in cooperative control with an ABS is removed by a sub-logic in a 4WD ECU, ABS SOLO 4WD in which only an ABS is mounted for 4WD is implemented.

Further, since the side effect of a 4WD control logic such as stop of 4WD control when an ABS signal is generated due to the difference in speed of left and right wheels without a brake operation on a low-friction road (snowy road or icy road) is removed only by a sub-logic of a 4WD ECU, driving ability is not deteriorated and the electronic 4WD system is not turned on, so the performance and stability of ABS SOLO 4WD are considerably improved.

Further, the present invention is connected with an electronic 4WD system without changing design of an ABS or ESC, so it is very useful for an ABS SOLO 4WD vehicle or a 4WD vehicle with an ABS and an ESC controller.

BRIEF DESCRIPTION OF THE DRAWINGS

FIGS. 1A and 1B are flowcharts illustrating a method of controlling an electronic 4WD system having reinforced ABS cooperative control performance according to an embodiment of the present invention.

FIG. 2 is an output diagram of an electronic 4WD system having reinforced ABS cooperative control performance according to an embodiment of the present invention.

DESCRIPTION OF SPECIFIC EMBODIMENTS

Figure 1A:
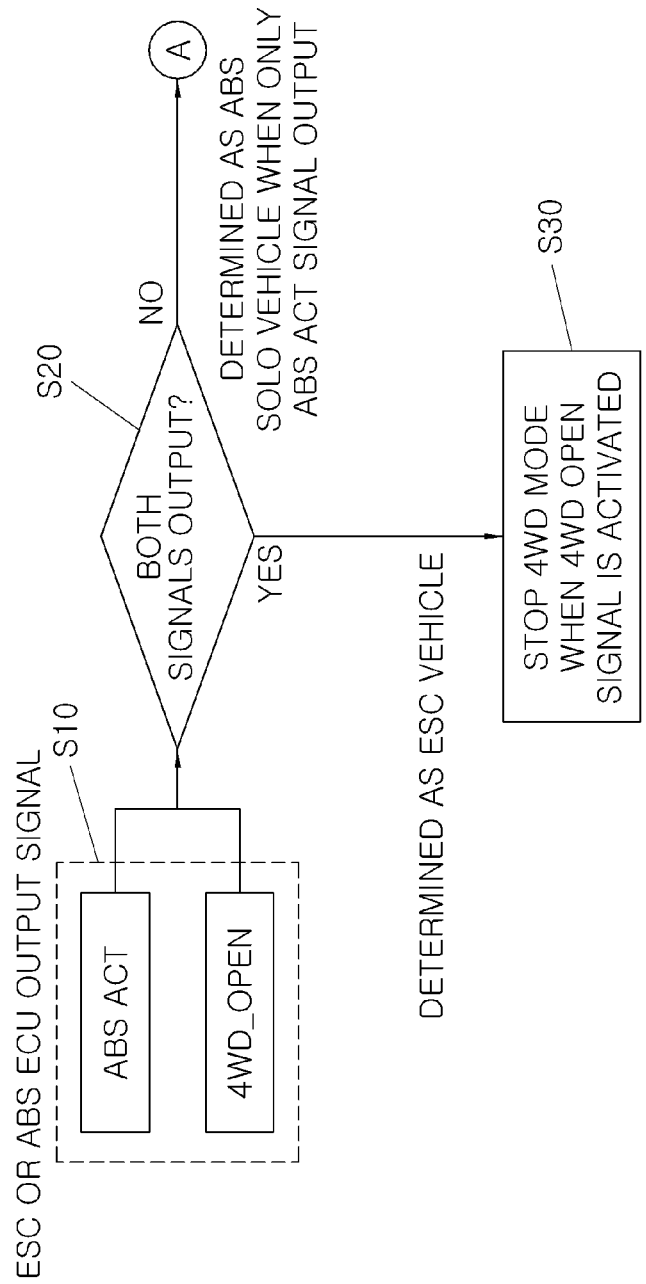

FIGS. 1A and 1B are flowcharts illustrating a method of controlling an electronic 4WD system having reinforced ABS cooperative control performance according to an embodiment of the present invention. FIG. 2 is a diagram showing an exemplary configuration of an electronic 4WD system controlled by the method shown in FIGS. 1A and 1B. Accordingly, control to be described hereafter is implemented through an electronic 4WD system 10.

Reference numeral 'S10' indicates a step in which ABS ACT and 4WD_OPEN signals are input to the electronic 4WD system 10, in which the ABS ACT signal is generated by an ABS (Anti-Lock Brake System) controller 200 and the 4WD_OPEN signal is generated by an ESC (Electronic Stability Control) controller 100.

In detail, the ABS controller 200 uses the ABS ACT signal as a stop signal requested by a 4WD ECU. Because a logic for removing the side effect of a 4WD control logic cannot be loaded on the ABS controller 200 in an ABS vehicle, there is no 4WD OPEN signal. In contrast, the ESC controller 100 uses the 4WD_OPEN signal as a stop signal requested by a 4WD ECU, because whether a driver operates a brake pedal is determined by checking the pressure of a master cylinder in a brake when an ABS ACT signal is activated. That is, as shown FIG. 2, the logic loaded on the ESC controller 100 to remove the side effect of a 4WD control logic determines whether the pressure of the master cylinder of a brake is over a reference pressure due to activation of an ABS _ACT signal, and then a request for stopping a 4WD mode is made.

The ABS_ACT and the 4WD_OPEN are output as CAN SIGNALs.

Reference numeral 'S20' indicates a step of determining whether an ABS_ACT and a 4WD_OPEN are both recognized by the electronic 4WD system 10.

When the electronic 4WD system 10 recognizes both of the ABS_ACT and the 4WD_OPEN in Step (S20), the electronic 4WD system 10 determines that it is an ESC vehicle and enters Step (S30), thereby performing cooperative control for stopping a 4WD mode according to activation of an 4WD OPEN signal.

In contrast, when the electronic 4WD system 10 recognizes only the ABS_ACT in Step (S20), the electronic 4WD system 10 determines that it is an ABS SOLO vehicle and enters a step, such as Step (S40), for removing the side effect of a 4WD control logic.

In detail, the intention of braking by a driver is determined in Step (S40), and to this end, the electronic 4WD system 10 determines whether the brake pedal has been pressed down in response to a signal from a brake pedal sensor or whether the accelerator pedal has been released in response to a signal from an accelerator pedal sensor.

When the electronic 4WD system 10 recognizes that the brake pedal has been pressed down and the accelerator pedal has been released in Step (S40), the system directly enters Step (S50), thereby performs cooperative control for stopping the 4WD mode in accordance with the intention of braking by the driver. On the contrary, when the electronic 4WD system 10 does not recognize that the brake pedal has been pressed down or the accelerator pedal has been released in Step (S40), the system directly enters Step (S60), determines that activation of ABS_ACT is caused by the difference in speed of left and right wheels without a brake operation on a low-friction road (snowy road or icy road), and keeps the 4WD mode.

Figure 3:
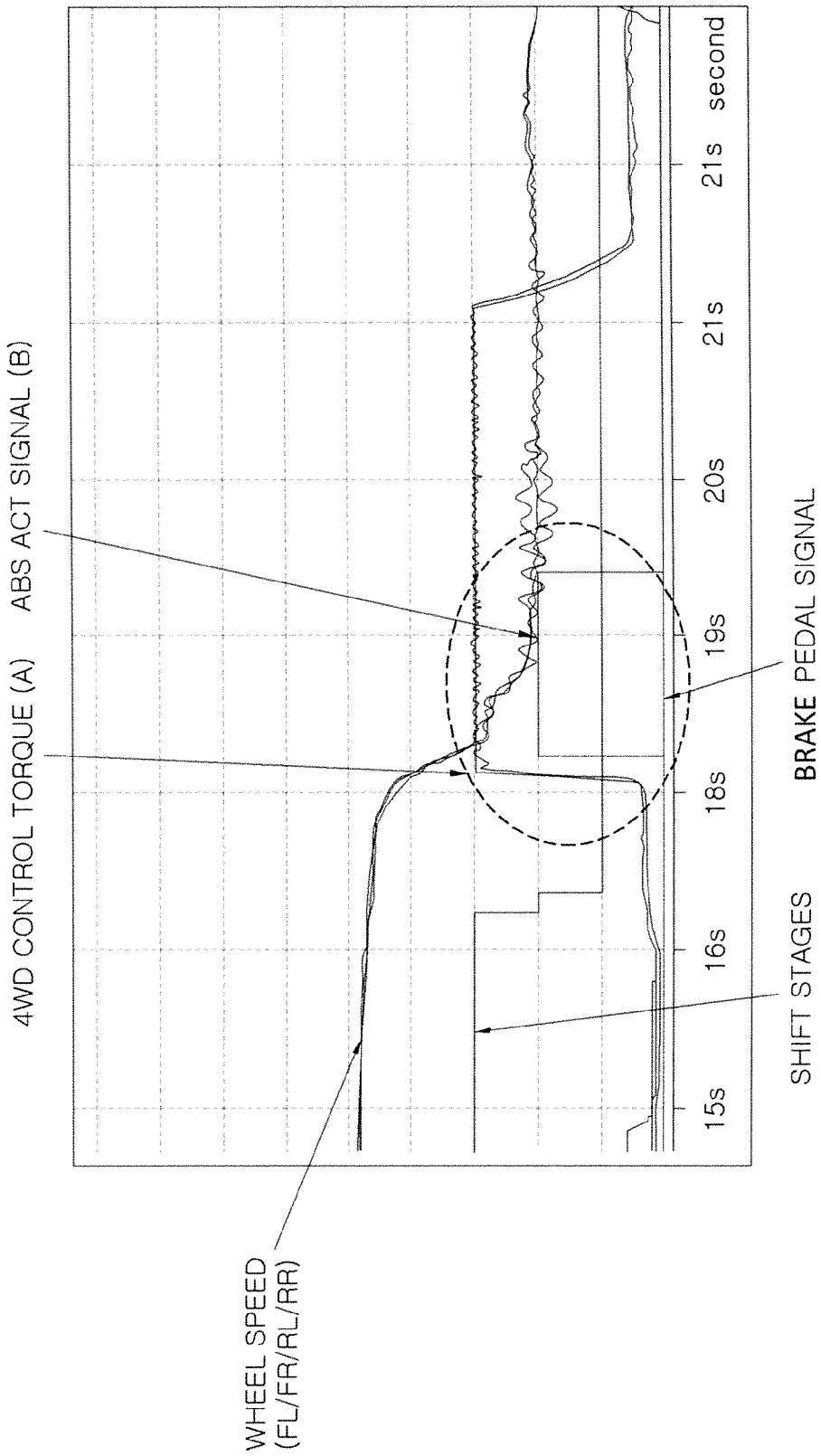
FIG. 3 is an exemplary configuration of an electronic 4WD system having reinforced ABS cooperative control performance according to an embodiment of the present invention.

The control results of Step (S20), Step (S40), and Step (S60) are exemplified in FIG. 3. As shown in the figure, ABS_ACT is activated at a specific time (B), but 4WD control torque is maintained at the time, so the side effect of a 4WD control logic that deteriorates driving ability or turns off the electronic 4WD system is removed.

In the electronic 4WD system having reinforced ABS cooperative control performance according to the embodiment, the ABS ACT signal by the ABS (Anti-Lock Brake System) controller 200 and the 4WD_OPEN signal by the ESC (Electronic Stability Control) controller 100 are used, and when the ABS ACT signal and the 4WD_OPEN signal are recognized, it is determined that it is an ESC vehicle and a 4WD mode is stopped, but when only the ABS ACT signal is recognized, it is determined that it is an ABS vehicle and the intention of a user is determined on the basis of whether a brake pedal has been pressed down or an accelerator pedal has been released, and then a 4WD mode is stopped. Accordingly, the side effect of a 4WD control logic on a low-friction road (snowy road or icy road) with ABS ACT activated without a brake pedal operation is removed. In particular, the limit of loading a logic on the ABS controller 200 is removed by a sub-logic of the electronic 4WD system, so the driving ability of ABS SOLO 4WD is not deteriorated and the electronic 4WD system is not turned off.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A method of controlling an electronic 4WD system having reinforced Anti-Lock Brake System (ABS) cooperative control performance, the method comprising:
    (A) recognizing, by an electronic 4WD system, an ABS ACT signal by an ABS controller and a 4WD_OPEN signal by an ESC (Electronic Stability Control) controller;

(B) determining that a driver intends to brake a vehicle and stopping a 4WD mode, when the ABS ACT signal and the 4WD_OPEN signal are both recognized;

(C) determining whether the vehicle is braked by intention of the driver on the basis of a brake pedal signal, when only the ABS ACT signal is recognized; and (D) stopping the 4WD mode upon determination that the vehicle is braked by intention of the driver when the brake pedal signal is transmitted, or maintaining the 4WD mode upon determination that the vehicle is braked regardless of intention of the driver, when the brake pedal signal is not transmitted.

2. The method of claim 1, wherein the determining whether the vehicle is braked by intention of the driver further uses a signal showing release of an accelerator pedal.

3. The method of claim 2, wherein the signal showing release of the accelerator pedal is an OFF-signal.

4. An electronic 4WD system having reinforced Anti-Lock Brake System (ABS) cooperative control performance, wherein an ABS controller and an Electronic Stability Control (ESC) controller are connected by CAN communication, and the system includes an ABS sub-logic that determines that it is an ESC vehicle and stops a 4WD mode when an ABS ACT signal by the ABS controller and a 4WD_OPEN signal by the ESC controller are both recognized, and determines that it is an ABS SOLO vehicle when only the ABS ACT signal is recognized, and stops the 4WD mode only when a signal indicating that a brake pedal has been pressed down or a signal indicating that an accelerator pedal has been released is detected.

* * * * *